Dec. 16, 1941. A. J. N. DUCLOS 2,266,416
CONTROL APPARATUS
Filed Jan. 14, 1939 2 Sheets-Sheet 1

INVENTOR
A. J. N. DUCLOS
BY
E. R. Nowlan
ATTORNEY

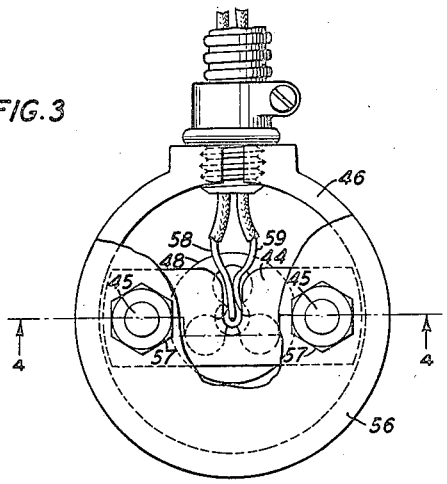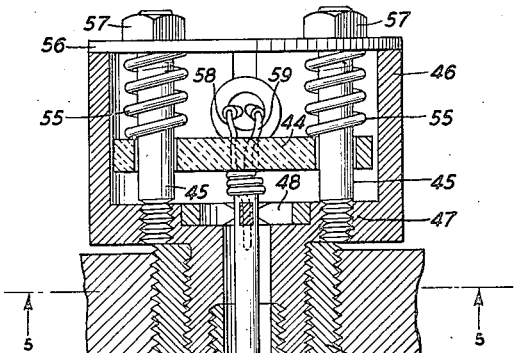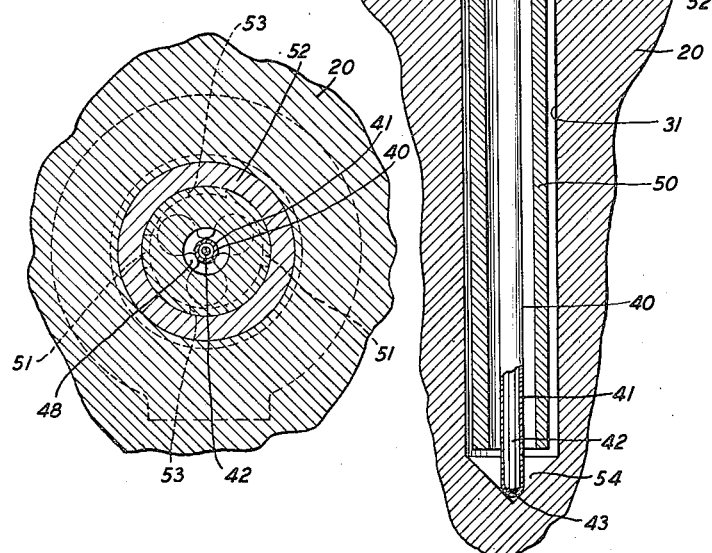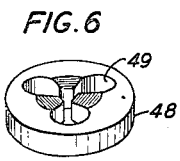

Patented Dec. 16, 1941

2,266,416

UNITED STATES PATENT OFFICE 2,266,416

CONTROL APPARATUS

Aeneas J. N. Duclos, South Orange, N. J., assignor to Western Electric Company, Incorporated, New York, N. Y., a corporation of New York Application January 14, 1939, Serial No. 250,944

4 Claims. (Cl. 136—4)

This invention relates to control apparatus, and more particularly to apparatus for controlling the internal temperatures of large masses.

In the art of manufacturing electrical conductor cables, such cables are frequently required to be provided with seamless sheaths of lead, lead alloy or the like material. This is ordinarily done by passing the cable core through the die block of an extrusion press, which forms lead or the like, supplied to the press, into a seamless tube closely ensheathing the core as the latter passes through a core mounted in the die block. The uniformity of thickness of the lead sheath thus formed is largely dependent upon the thermic state of the lead or other sheath material in the extrusion chamber of the die block especially in the immediate vicinity of the die. This is true not only as to the general or average temperature in the vicinity of the die block but still more perhaps as to differences in temperature in various directions radial to the axis of the die and of the core passing through it. The die block of a cable sheathing extrusion press is ordinarily a considerable and massive block of steel having an extension chamber within it, in which is sheath material about to be extruded. Variations in temperature of the contents of the chamber will be reflected in variations in the temperature of the containing block and vice versa, especially in those parts of the die block mass which are near to the extrusion chamber wall.

An object of the present invention is to provide simple, accurate and durable means to detect and report temperatures and variations of temperature at predeterminedly selected points within a large mass such as the die block of a cable sheathing press.

With the above and other objects in view, the invention may be embodied in a thermocouple device having a slender, rod-like outer form and means to support the device in a bore in a mass in such wise that only the extreme tip of the device shall have any contact with the substance of the mass to be thermically affected thereby.

Other objects and features of the invention will appear from the following detailed description of one embodiment thereof taken in connection with the accompanying drawings, in which the same reference numerals are applied to identical parts in the several figures and in which—

Fig. 3 is an enlarged end elevation of one of the thermocouple devices shown in Fig. 1;

Fig. 4 is a broken sectional view on the line 4—4 of Fig. 3;

Fig. 5 is a broken sectional view on the line 5—5 of Fig. 4; and

Fig. 6 is a detached view in perspective of a thermocouple holding element.

Figure 2:
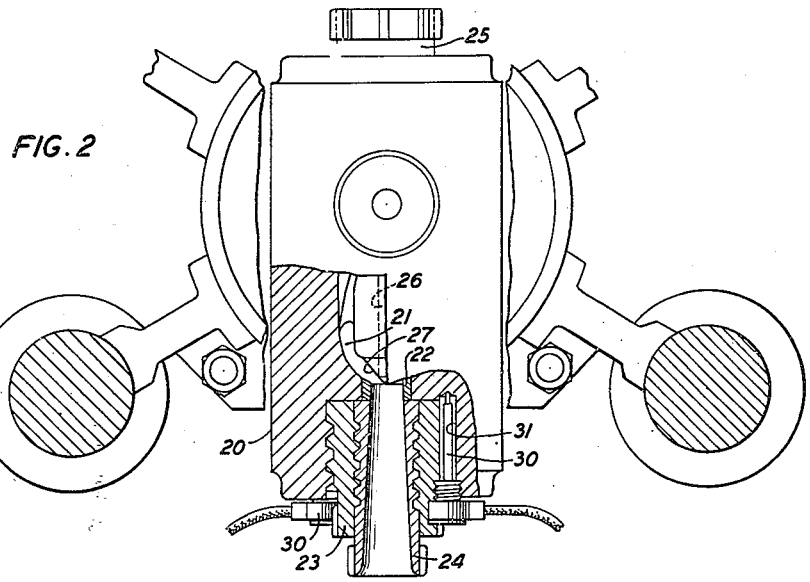
Fig. 2 is a partial sectional view thereof on the line 2—2 of Fig. 1.
Figure 1:
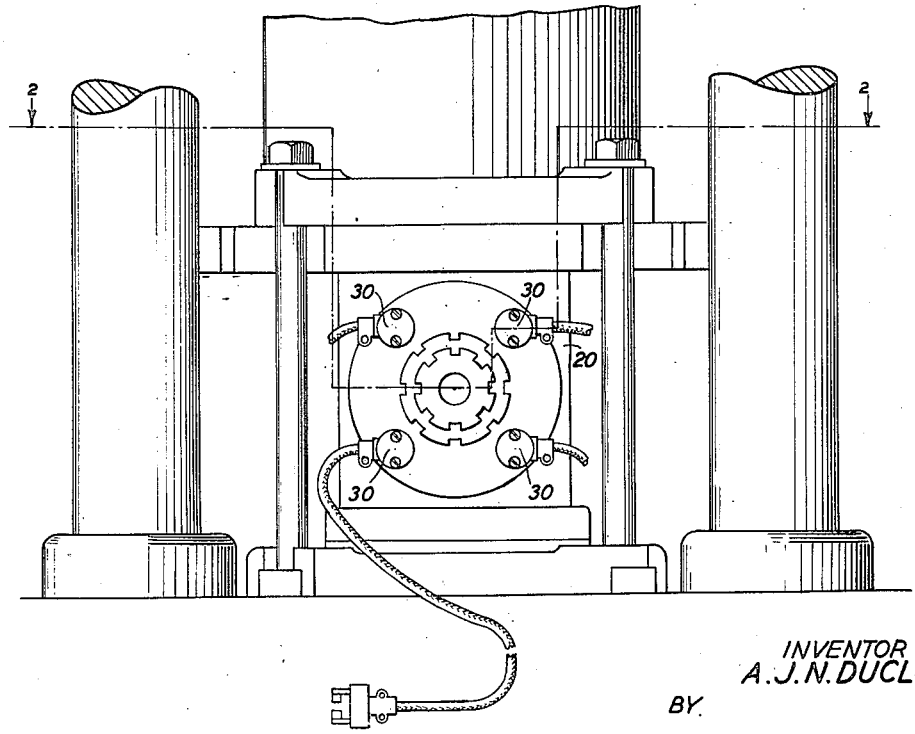
Fig. 1 is a front elevation of a cable sheathing extrusion press constructed in accordance with the invention.

The embodiment of the invention herein disclosed presents a cable sheathing extrusion press generally of any suitable organization and having a die block 20. Such presses are so well known that it appears unnecessary to extend the description of this press beyond such parts as are necessary for a full description of the invention itself.

The die block 20 is formed with an internal extrusion chamber 21 from which sheath material is extruded by the usual action of the press through a die 22 mounted in an appropriate aperture in the chamber wall and held in place by members 23 and 24. A cable core being sheathed (not shown) will enter the extrusion chamber from the rear through a core guide 25 which passes through the rear wall of the chamber and has an axial bore 26 to pass the core and a tapered nose 27 to coact with the die in forming the sheath on the core. The sheathed cable emerges from the die and via the axially bored member 24 from the press.

A plurality (here four) of thermoelectric devices 30 is mounted in a ring distribution in suitable bores 31 extending into the die blocks and terminating near the wall of the extrusion chamber. These devices 30 are distributed preferably symmetrically about the axis of the die. They are identically alike in structure and mounting and a description of any one will suffice for all.

Each of the devices 30, as best shown in Figs. 3, 4 and 5, comprises a generally rod-shaped thermocouple 40 consisting of a tubular member 41 enclosing an axially located wire or rod 42. The tube 41 and rod 42 are of any two of the unlike metals or alloys customarily used in such cases, and are not in contact except at their common tip 43 where the tube 41 is closed and the end of the rod 42 welded thereto. At its outer end, the tube 41 is mounted in a plate 44 of insulating material, which in turn is slidably carried on two bolts 45 mounted in the floor of a cup 46. This cup is formed with an integral external sleeve 47 of internal diameter greater than the external diameter of the tube 41 and through which the tube 41 passes axially thereof. A disk or washer 48 preferably of metal having the same thermal expansion coefficient as that of the member 46, 47 but which may be of any suitable material, and having a central trifoliate aperture 49, as shown in Fig. 6, is set into the floor of the cup 46 at the top of the bore of the sleeve 47, to position the outer end of the tube 41 axially in the sleeve. The aperture 49 is so formed, as shown, that the lugs only, between the three lobes of the aperture, touch the tube 41 and that only by a line contact.

A tubular protecting guard 50 is mounted coaxially in sleeve 47 and extends inwardly around, but not touching, the tube 41 nearly to the inner end thereof.

The sleeve 47 is formed on its outer surface with a screw thread which is cut away again entirely except for two short, diametrically opposed strips 51. A corresponding internally threaded collar 52 has its internal threads cut away along diametrically opposed strips leaving longitudinal threadless spaces 53 a trifle wider than the strips 51. The collar 52 is mounted at the outer end of the bore 31. Thus by matching the threaded strips 51 to the threadless space 53, the sleeve 47 with its associated parts may be thrust with straight line motion into the collar 52 and then, by a fraction of a turn, may be locked into the position shown in Figs. 3, 4 and 5, in the manner of the familiar bayonet joint or cannon breech lock. In this position, the tip 43 of the thermocouple 40 is pressed firmly into contact with the preferably conical bottom 54 of the bore 31 by the pressure of compression springs 55 interposed between the plate 44 and the cover 56 of the cup 46, the cover being held on by nuts 57 on the bolts 45.

It will be noted that, by the arrangement of the parts described, the thermocouple is completely housed and shielded against accidental damage and against changes of atmospheric temperature, while, at the same time, its temperature responsive tip is maintained in close contact with the substance of the die block whose internal temperature state is thus continuously reported through the thermocouple for continuous record by any suitable recording means or for periodic examination; and also, what is necessary for accurate functioning, the thermocouple is nowhere in contact with heated material except at its tip, where contact is desired, and at the washer 48, where the three line contacts are negligible in effect.

In the appended claims it is intended that the phrase "line contact" as applied to the support of the thermocouple 40 by the washer 48 shall mean not strictly a geometrical line of contact but a contact area sufficiently slight to be negligible in permitting transfer of heat from the washer to the thermocouple. It is also intended that the phrase "rod-like thermocouple" in the appended claims shall be taken to mean any rigid thermocouple device of generally slender and elongated form and having its thermo-responsive junction at its inner extremity and capable of being substituted for the specific structure 40 herein disclosed. Also the words "concave" and "concavely" as applied in the claims to the bottom 54 of the bore 31 are intended to include any form having the same centering effect on the tip of the thermostat as that of the conically concave bottom disclosed in Fig. 4.

While the invention is herein disclosed in a specific structure and as applied to the die block of a lead cable sheathing press, the invention is not so limited, but may be embodied in structures and applied to uses modified in various ways from the illustrative embodiment shown, and is limited only in scope and spirit by the appended claims.

What is claimed is:

1. The combination with a heated member having a concavely closed ended bore therein of a removable thermocouple unit for use in reporting temperature within the member, which unit comprises a rod-like thermocouple to be removably coaxially inserted into the bore, and of less diameter than the bore, a supporting disc having an axial perforation therein to receive and support the thermocouple slidably therein and to be removably positioned in coaxial alignment with the bore, and means to press the thermocouple longitudinally of itself to force the heat responsive inner end thereof against the concave end wall of the bore, the several parts being so proportioned and arranged that the concavely closed end of the bore and the supporting disc will maintain the thermocouple in a position to have contact with no heated part except the supporting disc and the end wall of the bore.

2. The combination with a heated member having a concavely closed ended bore therein of a removable thermocouple unit for use in reporting temperature within the member, which unit comprises a rod-like thermocouple to be removably coaxially inserted into the bore, and of less diameter than the bore, a supporting disc having an axial perforation therein to receive and support the thermocouple slidably therein and to be removably positioned in coaxial alignment with the bore, and means to press the thermocouple longitudinally of itself to force the heat responsive inner end thereof against the concave end wall of the bore, the several parts being so proportioned and arranged that the concavely closed end of the bore and the supporting disc will maintain the thermocouple in a position to have contact with no heated part except the supporting disc and the end wall of the bore, and the axial perforation of the supporting disc being of lobed form to give line contact only between the supporting disc and the thermocouple.

3. The combination with a heated member having a concavely closed ended bore therein of a removable thermocouple unit for use in reporting temperature within the member, which unit comprises a housing member to be removably seated in the open end of the bore coaxially therewith, a mounting member mounted in the housing to be slidable axially therein, a rod-like thermocouple positioned coaxially within the bore and the housing member and secured to the mounting member to be slidable therewith, a supporting disc mounted stationarily in the housing member and formed with an axial aperture to receive and slidably support the thermocouple, and means to press the thermocouple longitudinally of itself to force the heat responsive inner end thereof against the concave end wall of the bore, the several parts being so proportioned and arranged that the concavely closed end of the bore and the supporting disc will maintain the thermocouple in a position to have contact with no heated part except the supporting disc and the end wall of the bore.

4. The combination with a heated member having a concavely closed ended bore therein of a removable thermocouple unit for use in reporting temperature within the member, which unit comprises a housing member to be removably seated in the open end of the bore coaxially therewith, a mounting member mounted in the housing to be slidable axially therein, a rod-like thermocouple positioned coaxially within the bore and the housing member and secured to the mounting member to be slidable therewith, a supporting disc mounted stationarily in the housing member and formed with an axial aperture to receive and slidably support the thermocouple, and means to press the thermocouple longitudinally of itself to force the heat responsive inner end thereof against the concave end wall of the bore, the several parts being so proportioned and arranged that the concavely closed end of the bore and the supporting disc will maintain the thermocouple in a position to have contact with no heated part except the supporting disc and the end wall of the bore, and the axial perforation of the supporting disc being of lobed form to give line contact only between the supporting disc and the thermocouple.

AENEAS J. N. DUCLOS.